June 10, 1958     A. R. KUHN ET AL     2,838,627
BY-PASS ARRANGEMENT FOR AN ELECTRICAL METER MOUNT
Filed March 15, 1957     2 Sheets-Sheet 1

INVENTORS
ALFRED R. KUHN
FRANK T. HILL
BY John M. Calimafde
ATTORNEY

INVENTORS
ALFRED R. KUHN
FRANK T. HILL
BY John M. Calimafde
ATTORNEY

United States Patent Office 2,838,627
Patented June 10, 1958

2,838,627

BY-PASS ARRANGEMENT FOR AN ELECTRICAL METER MOUNT

Alfred R. Kuhn, Queens Village, and Frank T. Hill, West Hempstead, N. Y., assignors to Murray Manufacturing Corporation, Brooklyn, N. Y.

Application March 15, 1957, Serial No. 646,379

9 Claims. (Cl. 200—51.1)

This invention relates to an electrical meter mount of the kind used with a socket type meter having contact blades extending from its base.

More specifically, this invention relates to an arrangement for such a meter mount, which permits the removal of the meter without interrupting the flow of current from the line to the load.

Meter mounts, for socket type meters, comprise, generally, two pairs of conductive clips, insulated from each other and positioned to receive blades extending from the base of the meter; line supply conductors being connected to one pair of clips and load conductors to the other. Thus, when the meter is mounted with its blades inserted into the clips of the mount, the circuit current flows through the meter, and when the meter is removed, the flow of current is interrupted. In other words, upon removal of a meter, service to the customer is interrupted. In such meter mounts, there is no known way of readily by-passing or shorting the meter.

For the protection of the public, electric meters must be tested and calibrated at periodic intervals. The meter may be tested and calibrated at the customer's premises, or preferably, a "freshly" calibrated meter may be carried by the service man and substituted for the one being tested. The latter practice is preferred because it permits the utility company to test the meter at its laboratory.

However, it is apparent that either procedure produces an interruption in current flow, even if momentary. In the case of the ordinary residential customer, a momentary interruption of service while one meter is removed and another "plugged-in" is of little consequence. However, in serving business establishments, hospitals, doctors' offices, etc., even a momentary interruption of service cannot be permitted since it might result in serious hazards or embarrassments.

Accordingly, it is an object of this invention to provide means adapted for connection to the meter mount which permits removal of the meter without interruption of service to the customer.

It is a feature of our invention to provide a device for by-passing the meter which requires no physical or electrical change in the original meter or meter mount.

It is a further feature of our invention to provide by-passing means which can be added to existing installations easily and simply.

In accordance with an aspect of our invention, there is provided an adapter comprising contact blades mounted on one side thereof for connection to "line" and "load" clips in the meter mount, and clips mounted on the opposite side thereof, for connection to the meter contact blades; the invention is characterized in that means are provided for controllably shorting the line clips to the load clips while the meter is connected to the adapter, thereby permitting the removal of the meter without interrupting the flow of current to the load.

The above-mentioned and other features and objects of this invention and the manner of attaining them will become more apparent and the invention itself will be best understood by reference to the following description of an embodiment of the invention taken in conjunction with the accompanying drawings, wherein.

Figure 2:
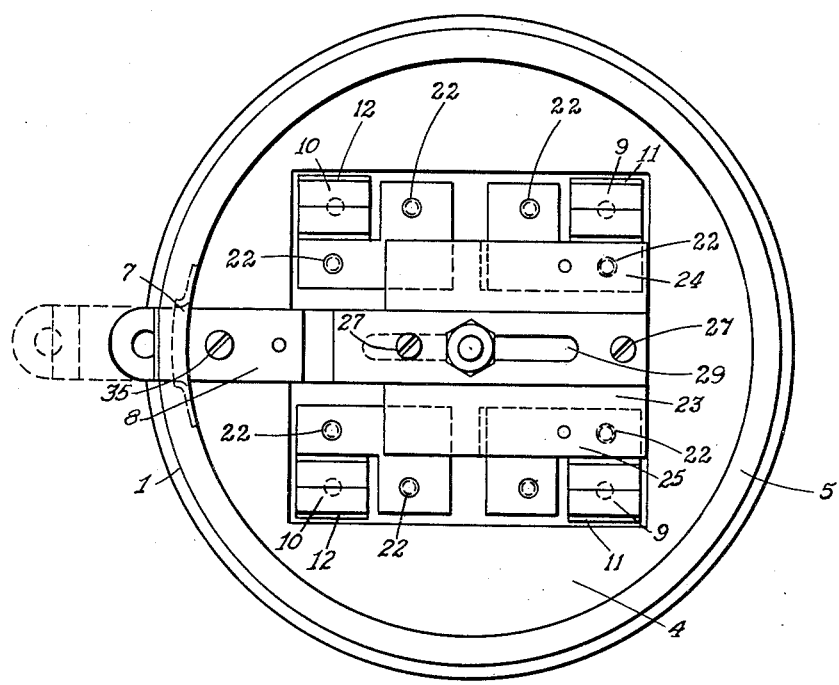
Fig. 2 is a top view of the embodiment shown in Fig. 1.

Before referring to the drawings which illustrate the adapter of our invention, it would be helpful to understand the general construction of the meter mount. The mount comprises a trough which may be either circular or rectangular and includes two pairs of clips, spaced and insulated from each other; one pair of which is connected to the line conductors and the other pair to the load conductors. The meter has two pairs of blades extending from the base thereof, which when mounted on the trough extend into the clips in the mount and complete a circuit from the line, through the meter, to the load.

The meter is sealed to the trough, in order to prevent tampering with the meter circuit, by a ring having a C shaped contour which encloses the edges of abutting flanges extending from the meter and trough respectively.

The arrangement thus far described is conventional and, in itself, forms no part of the present invention.

In accordance with our invention, we provide an adapter for the above-described meter mount which permits removal of the meter without interruption of the service.

Referring now to the figures, the adapter comprises a collar member 1 having at one end a flat flange 2, attached by rivets 3, to an insulator base 4, and at the other end a rolled flange 5 which abuts the edge portion of a socket type meter 6. A slot 7 is provided in the collar, toward the bottom thereof, for a pull-down tab 8.

The inside portion of the base 4 (which may be constructed of either one or two pieces) is recessed wherein the current carrying parts are attached.

The current carrying parts comprise two pairs of metal clips 9 and 10 respectively; the clips 9 being connected to the line side of the meter and the clips 10 to the load side. The clips 9 and 10 are supported on conductive members 11 and 12 respectively. The conductive members may take any suitable form, it being essential only that they be discretely spaced and positioned. As shown, the conductive members are substantially in the form of a U, one leg of the U being raised to which a clip is secured and the base and other leg of the U being flat and parallel to the insulator base 4. The base, e. g. 13 (Fig. 3) of one conductive member of pair 11 is substantially aligned with the base 14 of one conductive member of pair 12.

Attached to the underside of the pairs of conductive members 11, 12 are corresponding pairs of blade elements 15, 16. The blade elements 15, 16 comprise flat parts 17, 18 respectively which underlie the conductive members 11, 12 and rest on the insulator base 4, and blade parts 19, 20 which extend through slots 21 in the base and protrude from the back thereof.

The current carrying members 11, 12 and 15, 16 are attached to the insulator base 4 by any suitable means, such as screws 22.

Thus, the adapter unit is connected to the meter mount by simply inserting the blades 19, 20 into the clips provided in the mount (not shown).

Figure 3:
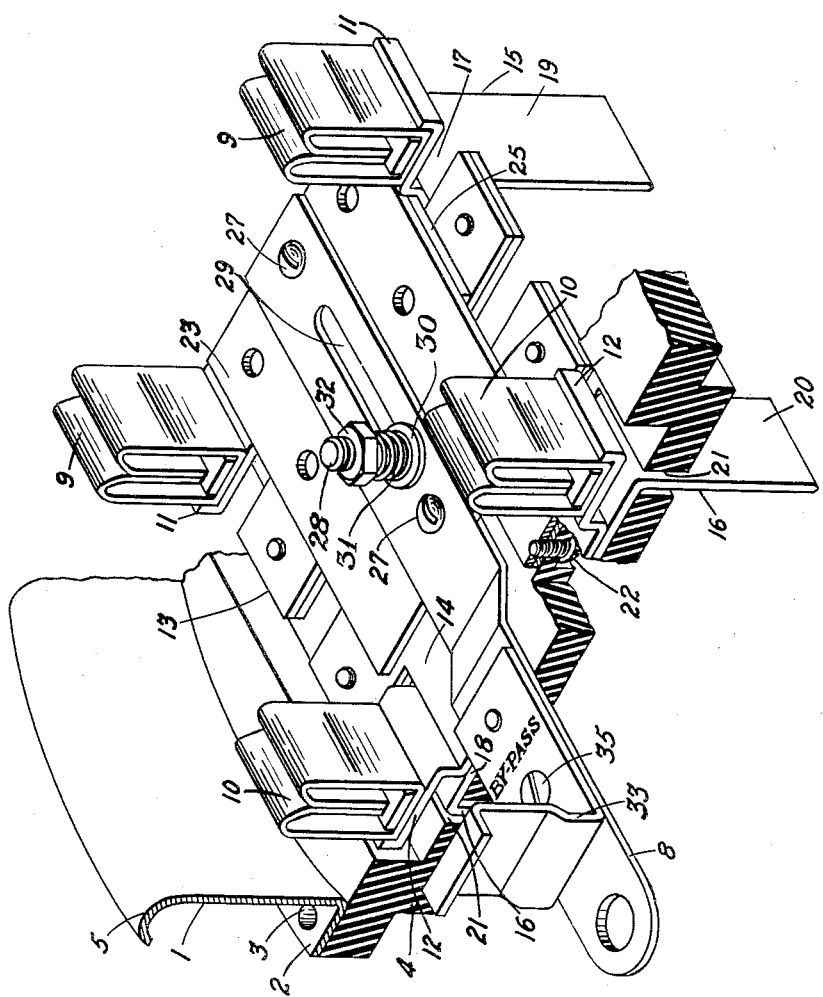
Fig. 3 is a perspective view of the essential parts of the adapter.

It should now be apparent that in order to by-pass the meter, it is necessary to short the conductive members 11 to the conductive members 12. This is accomplished by means of a bridge-type insulator member 23 carrying shorting-bars 24, 25 attached to one side thereof by means of protuberances on the shorting bars and conforming indentations or openings in the insulator bridge. The shorting bars are arranged to slide over the base portions of the conductive members and are longer in length than the space between adjacent conductive members, whereby when the insulator bridge is at one extreme position, as shown in Fig. 3, the respective shorting bars contact only the conductive members of the same pair and therefore do not alter the meter circuit. However, as shown by dash lines in Figs. 1 and 2, when the insulator bridge is moved to the other extreme position, the respective shorting bars contact the aligned base portions of the conductive members, and thereby short the meter out of circuit.

The position of the insulator bridge is controlled by the pull-down tab 8, extending through the slot in the collar 1, which is attached to the insulator bridge by means of screws 27.

The sliding travel of the insulator bridge and shorting bars is guided by a bolt 28, passing through the base 4 and elongated slot 29, in the tab 8. The bolt 28 is retained by washer 30, spring 31 and nut 32 to maintain resilient sliding contact between the shorting bars and the conductive parts.

In order to prevent tampering with the adapter, an angle plate 33 is provided which extends from the tab 8 and is located adjacent the collar 1 when the by-pass is inoperative. The angle plate 33 is provided with a flange 34 which is contiguous to and underlies the flange 5 of the collar. The plate 33 is attached to the tab 8 by screws 35.

Figure 1:
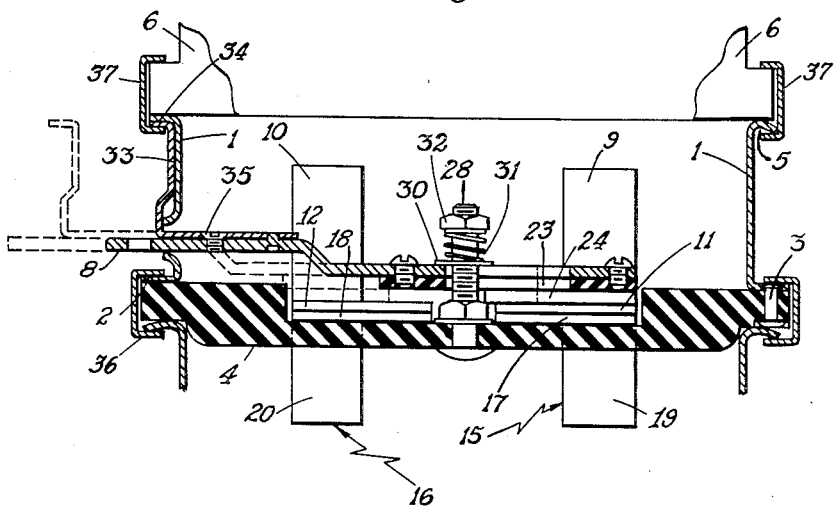
Fig. 1 is a cross-sectional side view of an embodiment of the adapter.

As best seen in Fig. 1, the base of the adapter is fastened to the meter mount by means of a sealed clamp 36, and the other end of the adapter including the by-pass pull-down tab are fastened to the meter by a similarly shaped sealed clamp 37.

If desired, the pull-down tab 8 may be provided with indicating means such as the words "By-Pass" to give a visual indication when the meter is shorted.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. In a meter mount for a socket type meter, the meter having two pairs of contact blades extending from the base thereof, the mount having two pairs of conductive clips positioned to receive said contact blades respectively, one pair of said clips being for connection to the line power supply and the other pair being for connection to the load; an arrangement for by-passing the meter so that the meter may be removed without interrupting the flow of current to the load, comprising an adapter having contact blades on one side thereof for connection to the respective clips in the meter mount and clips mounted on the opposite side for connection to the respective meter contact blades, and means for controllably shorting the meter mount clips connected to the line, to the clips connected to the load, said means being manually operable while the meter is maintained in operating position.

2. The adapter according to claim 1 and further comprising means for indicating visibly while the meter is in place whether or not such shorting has been effected.

3. In the meter mount according to claim 1, wherein said controllable shorting means comprises a pair of shorting bars electrically insulated from each other and mounted in sliding contacting relation with respective adapter clips of a given pair, and means for sliding said shorting bars from said given pair of adapter clips over corresponding clips of both of said pairs, thereby shorting said opposite pairs of clips together.

4. The adapter according to claim 3, and further comprising a collar, an insulator base attached to one end of said collar, each of said adapter clips having a flat portion parallel to said base, the flat portions of each pair being mounted side-by-side and oppositely disposed to the flat portions of the other pair, the oppositely disposed flat portions of corresponding clips being aligned and spaced a given distance apart, said controllable shorting means comprising a pair of shorting bars mounted in sliding contacting relation with respective flat portions of a given pair, the length of said shorting bars being greater than the space between said flat portions and means for sliding said shorting bars simultaneously from the flat portions of one of said pairs over the flat portions of corresponding clips of both of said pairs.

5. The adapter according to claim 4, wherein said controllable shorting means comprises an insulator bridge member overlying said flat portions of said pairs of clips, and said shorting bars being attached to the underside thereof, a tab member attached to the opposite side of said bridge member and extending through a slot in said collar to the outside thereof, whereby movement of said shorting bars is controlled by operation of said tab member, and means for guiding the travel of said bridge member.

6. In a meter mount for a socket type meter having contact blades extending from the base thereof, and including two pairs of conductive clips, electrically insulated and positioned to receive said contact blades, one pair of said clips being for connection to the line power supply and the other pair being for connection to the load; an adapter for by-passing said meter so that the meter may be removed without interrupting the flow of current to the load, comprising a collar, an insulator base attached to one end of said collar, two pairs of contact blades and two pairs of clips respectively connected together and mounted on one side of said insulator base, said clips being positioned for connection to the meter blades, and said blades passing through slots in the base and extending from the opposite side thereof, for connection to the clips in the meter mount; each of said adapter clips having a flat portion parallel to said base, the flat portions of each pair being mounted side-by-side and oppositely disposed to the flat portions of the other pair, the oppositely disposed flat portions of corresponding clips being aligned and spaced a given distance apart; and means for controllably shorting the adapter clips connected to the line, to the adapter clips connected to the load, comprising an insulator bridge overlying said flat portions of said pairs of clips, a pair of shorting bars mounted to the underside of said insulator bridge in sliding contacting relation with respective flat portions of a given pair, the length of said shorting bars being greater than the space between said flat portions, a tab member attached to the opposite side of said bridge member and extending through a slot in said collar to the outside thereof, and means for guiding the travel of said bridge member, whereby the movement of said shorting bars is controlled by the operation of said tab member.

7. The adapter according to claim 6, wherein said means for guiding the travel of said bridge member, comprises a bolt passing through said base member and aligned holes in said bridge and tab member, a spring mounted on said bolt over said tab member and a nut engaging said bolt and urging said spring against said tab member, whereby said shorting bars are resiliently urged against said flat portions of said clips.

8. The adapter according to claim 7, wherein said collar comprises flanges at opposite ends thereof, means attaching one of said flanges to said base, the edge of the base abutting a flange on the meter mount, and the flange at the opposite end of said collar abutting a flange on said meter, a first C-shaped ring enclosing the edge of the base and the flange of the meter mount and a second C-shaped ring enclosing the flange of the collar and the flange of the meter.

9. The adapter according to claim 8, and further comprising an angle member attached to, and extending from said tab on the portion thereof outside said collar, said angle member having a shape conforming to the wall of said collar and including a flange adjacent to a flange on said collar when said shorting bars are in the inoperative position, and one of said rings enclosing also the flange on said angle member, whereby undesired movement of said tab and shorting bars is prevented.

References Cited in the file of this patent

UNITED STATES PATENTS

| | | |
|---|---|---|
| 2,066,299 | Mylius | Dec. 29, 1936 |
| 2,192,826 | Cole | Mar. 5, 1940 |
| 2,370,043 | Johansson | Feb. 20, 1945 |
| 2,747,049 | Johansson | May 22, 1956 |
| 2,747,050 | Johansson | May 22, 1956 |